(12) United States Patent
Chang et al.

(10) Patent No.: US 11,482,035 B2
(45) Date of Patent: Oct. 25, 2022

(54) ELECTRONIC DEVICE

(71) Applicant: InnoLux Corporation, Miao-Li County (TW)

(72) Inventors: Kuei-Sheng Chang, Miao-Li County (TW); Po-Yang Chen, Miao-Li County (TW); Kuo-Jung Wu, Miao-Li County (TW); I-An Yao, Miao-Li County (TW); Wei-Cheng Lee, Miao-Li County (TW); Hsien-Wen Huang, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/115,739

(22) Filed: Dec. 8, 2020

(65) Prior Publication Data

US 2021/0200976 A1 Jul. 1, 2021

(30) Foreign Application Priority Data

Dec. 26, 2019 (CN) .......................... 201911367545.5

(51) Int. Cl.
*G06F 3/0488* (2022.01)
*G06V 40/13* (2022.01)
*G02F 1/137* (2006.01)
*G02F 1/1334* (2006.01)
*G02F 1/1333* (2006.01)

(52) U.S. Cl.
CPC .......... *G06V 40/1318* (2022.01); *G02F 1/137* (2013.01); *G02F 1/1334* (2013.01); *G02F 1/13338* (2013.01)

(58) Field of Classification Search
CPC ..... G06K 9/0004; G02F 1/1334; G02F 1/137; G02F 1/13338; G02F 1/1335; A61B 5/1495; G06V 40/1318; G01J 3/2803
See application file for complete search history.

(56) References Cited

U.S. PATENT DOCUMENTS

| | | |
|---|---|---|
| 2012/0321149 A1 | 12/2012 | Carver |
| 2013/0082911 A1 | 4/2013 | Momose |
| 2017/0270340 A1 | 9/2017 | Gao |
| 2018/0087962 A1* | 3/2018 | Chang ................ G01J 3/2803 |
| 2018/0260602 A1* | 9/2018 | He ...................... A61B 5/1495 |
| 2019/0114457 A1 | 4/2019 | Li |
| 2019/0228204 A1 | 7/2019 | Park |
| 2020/0057000 A1* | 2/2020 | Fourre ................ G06K 9/0004 |
| 2020/0409191 A1* | 12/2020 | He ...................... G02F 1/1335 |

* cited by examiner

*Primary Examiner* — Abdul-Samad A Adediran
(74) *Attorney, Agent, or Firm* — Winston Hsu

(57) ABSTRACT

An electronic device includes a cover layer, a light control panel, an optical fingerprint sensor and a first light source disposed at the same side of the cover layer. The first light source is for fingerprint sensing and capable of providing a light of which half-value angle is between −15° and 15°.

15 Claims, 7 Drawing Sheets

ELECTRONIC DEVICE

BACKGROUND OF THE DISCLOSURE

1. Field of the Disclosure

The present disclosure relates to an electronic device, in particular to an electronic device including a collimated light source.

2. Description of the Prior Art

Generally speaking, fingerprint recognition may be applied to identity recognition. Therefore, with the technological development of electronic devices, the function of fingerprint recognition has also been integrated in various electronic devices for wide applications. However, in the current display panels embedded with the fingerprint recognition function, the fingerprint recognition is not ideal because the sensor element is more susceptible to the interference of stray light. Therefore, it is still needed in the industry to come up with methods to improve the accuracy of fingerprint recognition.

SUMMARY OF THE DISCLOSURE

In view of this, it is necessary to provide an electronic device and a manufacturing method thereof to solve the technical problems of the flexible electronic devices. One of the objectives of the present disclosure is to provide an electronic device with a fingerprint recognition function and a method for improving the interference of stray light when the electronic device receives fingerprint data. The first light source for use in fingerprint sensing may provide collimated light.

According to an embodiment of the present disclosure, an electronic device is provided. The electronic device includes a cover layer, a light control panel, an optical fingerprint sensor, and a first light source. The first light source is disposed on the same side of the cover layer, and the first light source for use in fingerprint sensing may provide light of which half-value angle is between −15° and 15°.

The embodiment of the present disclosure also provides another electronic device. The electronic device includes a cover layer, a backlight element, a light control panel, an optical adjustable structure, and an optical fingerprint sensor. The light control panel is disposed between the cover layer and the backlight element. The optical adjustable structure is disposed in the light control panel. The optical fingerprint sensor is disposed between the backlight element and the cover layer. The backlight element provides light for fingerprint sensing, and the light may pass through the optical adjustable structure.

The embodiment of the present disclosure provides another electronic device. The electronic device includes a cover layer, a light control panel and a first light source. The light control panel and the first light source are disposed at the same side of the cover layer, and the first light source provides light of which half-value angle is between −15° and 15°.

These and other objectives of the present disclosure will no doubt become obvious to those of ordinary skill in the art after reading the following detailed description of the embodiment that is illustrated in the various figures and drawings.

DETAILED DESCRIPTION

Figure 1:
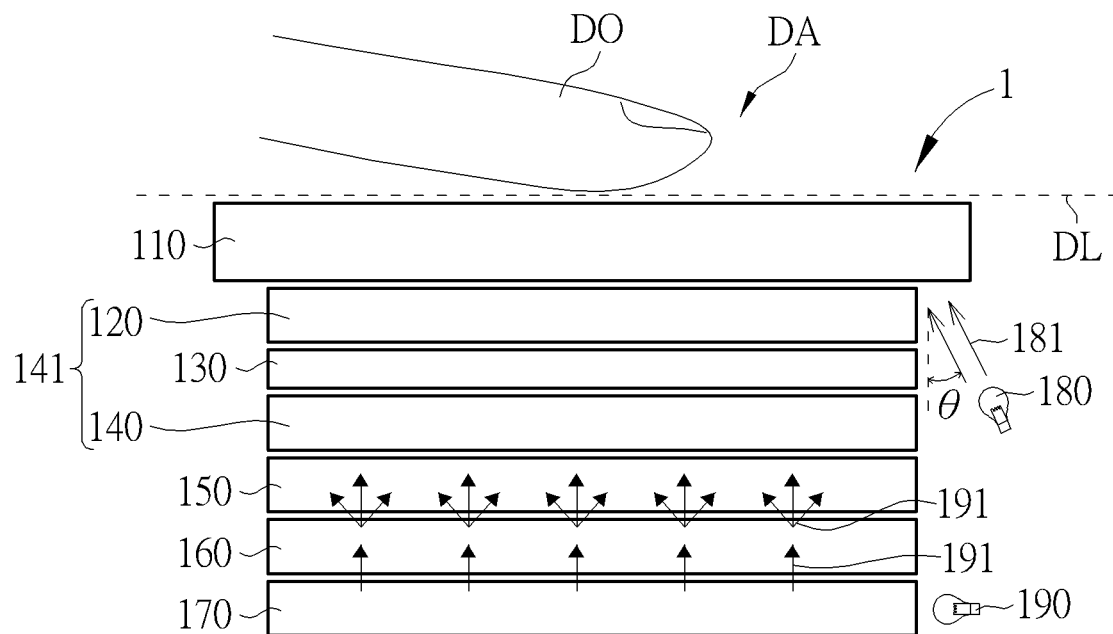
FIG. 1 is a schematic diagram of the electronic device of the first embodiment of the present disclosure. The structure of each element is shown in a cross-sectional view.

To provide a better understanding of the present disclosure to those skilled in the art, embodiments will be detailed as follows. The embodiments of the present disclosure are illustrated in the accompanying drawings with numbered elements to elaborate on the contents and effects to be achieved. It is needed to note that the drawings are simplified schematic diagrams, and therefore, the drawings show only the components and combinations associated with the present disclosure, and to provide a clearer description of the basic architecture or method of implementation of the present disclosure. The components would be complex in reality. In addition, for explanation, the components shown in the drawings of the present disclosure are not drawn to the actual number, shape, and dimensions, and the detail can be adjusted according to the design requirements.

Certain terms are used throughout the description and following claims to refer to particular components. As one skilled in the art will understand, electronic equipment manufacturers may refer to a component by different names. This document does not intend to distinguish between components that differ in name but not in function. In the following description and in the claims, the terms "include", "comprise" and "have" are used in an open-ended fashion, and thus should be interpreted to mean "include, but not limited to . . . ".

It will be understood that when an element or layer is referred to as being "on another component or on another layer" or "connected to another component or to another layer", it can be directly on or directly connected to the other element or layer, or intervening elements or layers may be presented. In contrast, when an element is referred to as being "directly on" or "directly connected to" another element or layer, there are no intervening elements or layers presented.

It should be noted that the technical features in different embodiments described in the following can be replaced, recombined, or mixed with one another to constitute another embodiment without departing from the spirit of the present disclosure.

FIG. 1 is a schematic structural diagram of the electronic device of the first embodiment of the present disclosure, and the structure of each element is shown in a cross-sectional view. The electronic device 1 of the first embodiment of the present disclosure includes a cover layer 110, an optical fingerprint sensor 130, a light control panel 141, and a first light source 180. In some embodiments, the electronic device 1 may also optionally include a color filter layer 120, a transistor array 140, an optical structure layer 150, a diffusing layer 160, a light guide plate 170 or the second light source 190, and the above elements are all arranged relative to the detection object DO (such as a finger), that is, the detection object DO is in a detection area DA (the region above the detection line DL in FIG. 1 indicating the detection area corresponding to the detection line DL) when the electronic device 1 is used to detect the detection object DO, and the components of the electronic device 1 are all disposed on the same side of the detection line DL, that is, on the side opposite to the detection area DA. The detection line DL may be an extension line of the upper surface of the cover layer 110 (the surface adjacent to the detection object DO).

The electronic device 1 may include a display device, an antenna device, a sensing device or a tiled device, but the present disclosure is not limited thereto. The electronic device 1 may include a bendable electronic device or a flexible electronic device. The electronic device 1 may, for example, include a liquid crystal or a light emitting diode; the light emitting diode may, for example, include an organic light emitting diode (OLED), a sub-millimeter light emitting diode (mini LED), a micro light emitting diode (micro LED) or a quantum dot (QD) light emitting diode (for example, QLED), fluorescence, phosphor or other suitable materials, and the materials may be optionally combined, but the present disclosure is not limited thereto. The antenna device may be, for example, a liquid crystal antenna, but the present disclosure is not limited thereto. The tiled device may be, for example, a display tiled device or an antenna tiled device, but the present disclosure is not limited thereto. It should be noted that the electronic device 1 may be the optional combination of the above, but the present disclosure is not limited thereto. Hereinafter, the display device is used as an electronic device or a tiled device to describe the present disclosure, but the present disclosure is not limited thereto.

In detail, the optical fingerprint sensor 130, the color filter layer 120, the transistor array 140, and the first light source 180 all may be disposed on the same side of the cover layer 110 opposite to the detected object DO, such as the optical fingerprint sensor 130 may be disposed between the transistor array 140 and the cover layer 110, but the present disclosure is not limited thereto. The relative positions of the color filter layer 120 and the optical fingerprint sensor 130 may also be interchanged. In the electronic device 1 of the first embodiment, the first light source 180 and the second light source 190 may be independently controlled. The first light source 180 may provide collimated beams, and the emitted light 181 may be emitted at substantially the same angle. The second light source 190 may be non-collimated beams, such as side-in backlight, and the rays emitted may not necessarily be emitted at the same angle. In the first embodiment of the present disclosure, the first light source 180 may be disposed adjacent to the cover layer 110, for example, closer to the cover layer 110 than the second light source 190, the diffusing layer 160 or the light guide plate 170. The light 181 of the first light source 180 may have an oblique incident light angle θ with respect to the cover layer 110. The first light source 180 or the second light source 190 may be disposed on the same side of the detection line DL.

The electronic device 1 of the first embodiment may be any device that may generate light, for example, a device that may generate light to display images or pictures. For example, the electronic device 1 of this embodiment may be a display, such as a liquid crystal display, an organic light emitting display, a light emitting diode display, a quantum dot material display, or other suitable displays. The electronic device 1 of this embodiment further has a built-in sensor that may be used to sense fingerprint data, so that the electronic device 1 may have a fingerprint recognition function; for example, may include an optical fingerprint sensor 130 and a first light source 180, but the present disclosure is not limited thereto.

Please refer to FIG. 1. The cover layer 110 may be disposed on the uppermost layer of the electronic device 1 of the first embodiment. The cover layer 110 may be a transparent glass layer, but the present disclosure is not limited thereto. The two ends of the cover layer 110 may also be designed to be arc-shaped or inclined surfaces to help collect or adjust the light 181 emitted by the first light source 180. On the one hand, the cover layer 110 may be disposed on the uppermost layer of the electronic device 1 to serve as a protective layer to reduce the probability of the electronic device 1 affected by the external environment or damaged. The surface of a user's finger (i.e. the detection object DO) is a fingerprint pattern (not shown) composed of ridges and fingerprints. When the fingerprint pattern touches or is close to the surface of the cover layer 110, the electronic device 1 activates the fingerprint sensing mode. Both ridges and fingerprints may have different reflection effects with respect to light. These differences help to convert light into valley-ridge signals for identification, that is, recognition of the user's identity.

The optical fingerprint sensor 130 may be disposed under the color filter layer 120, and the color filter layer 120 may be disposed under the cover layer 110 to be protected by the cover layer 110. The color filter layer 120 may include a plurality of color filters, and may have color filters of different colors. The transistor array 140 may be disposed under the color filter layer 120, the transistor array 140 may include a plurality of thin film transistors (not shown), and between the transistor array 140 and the color filter layer 120 there may be a liquid crystal layer (not shown), but the present disclosure is not limited thereto. The color filter layer 120 and the transistor array 140 may be collectively referred to as a light control panel 141 for generating light to display a predetermined image or picture. The light control panel 141 may include a liquid crystal or electronic paper. The color filter layer 120 may be arranged to correspond to the transistor array 140. The switching of the thin film transistors may control the turning of the liquid crystal molecules in the liquid crystal layer. The liquid crystal materials in the liquid crystal layer may include various suitable liquid crystal materials, such as the nematic liquid crystal, the smectic liquid crystal, and the cholesteric liquid crystal, but the present disclosure is not limited thereto.

The optical structure layer 150 may be disposed under the transistor array 140, and may include a brightness enhancement film (BEF), an advanced structured optical composite (ASOC), a blue light transmitting mirror (BLT), or all combinations thereof, but the present disclosure is not limited thereto. The optical structure layer 150 may help adjust the optical properties of the electronic device 1, such as the effect of concentrating light, but the present disclosure is not limited thereto. In some embodiments, the light control panel 141 may be disposed on the optical structure layer 150. In another embodiment, the optical structure layer 150 may be disposed on the light guide plate 170.

The second light source 190 may, for example, be used as a side-in type backlight source to emit light 191 and light 191 enters the light guide plate 170 from one side of the light guide plate 170 to help the light 191 be transmitted to the diffusing layer 160. The diffusing layer 160 may be disposed on the light guide plate 170 to help adjust the angle of light 191 leaving the diffusing layer 160. In some embodiments, the diffusing layer 160 may be disposed between the optical structure layer 150 and the light guide plate 170.

Figure 2:
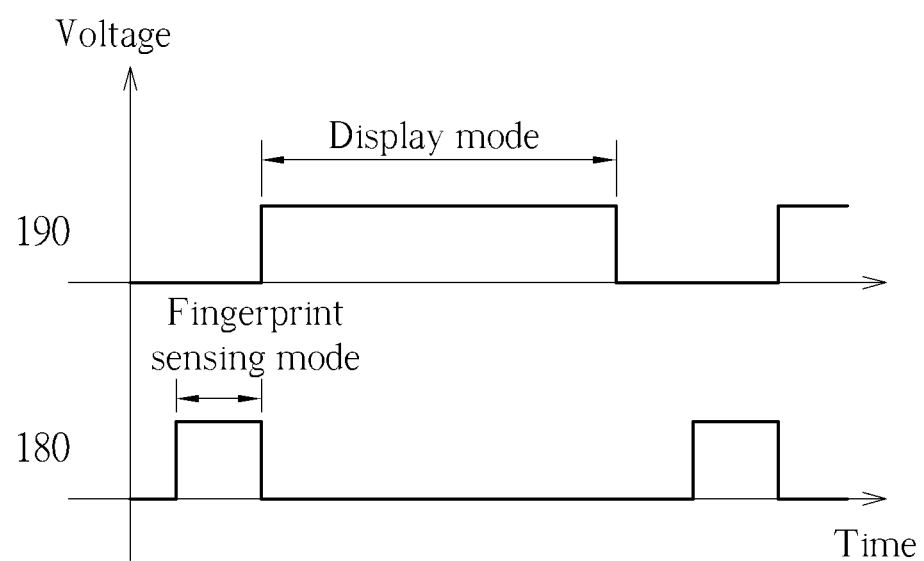
FIG. 2 is a schematic diagram showing the switching control of the first light source and the second light source of the electronic device of the first embodiment of the present disclosure.

FIG. 2 is a schematic diagram showing the switching control of the first light source 180 and the second light source 190 of the electronic device 1 of the first embodiment of the present disclosure. In FIG. 2, the horizontal axis represents time, and the vertical axis represents the voltage at which the first light source 180 or the second light source 190 is turned on and off. The unit of time is, for example, in milliseconds (ms), and the unit of voltage is, for example, in Volt (V), but the present disclosure is not limited thereto. Please refer to FIG. 1 and FIG. 2, the electronic device 1 of the first embodiment may have a fingerprint sensing mode and a display mode, respectively. According to the present disclosure, the user may first touch or approach a specific area of the sensing unit of the electronic device 1 with a finger when the user, for example, wants to do fingerprint recognition on the electronic device 1 to unlock the device, and then activate the fingerprint sensing mode of the electronic device 1 of the present disclosure. In terms of time, the first light source 180 is turned on when the electronic device 1 is in the fingerprint sensing mode, so that the light 181 and the optical fingerprint sensor 130 help the recognition the user's identity. At this time, the second light source 190 of the electronic device 1 may be turned off, that is, the electronic device 1 is not in the display mode. When at least a part of the light 181 is reflected by the fingerprint pattern, it may enter the cover layer 110 first before entering the light control panel 141 for the first time, so at least a part of the light 181 may first enter the cover layer 110 at a different inclination angle θ to increase the flexibility of design of the first light source 180 in the electronic device 1.

Then, when the electronic device 1 is in the display mode, the second light source 190 may be turned on to display a predetermined image or picture. At this time, the first light source 180 of the electronic device 1 may be turned off, that is, the electronic device 1 is not in the fingerprint sensing mode. As shown in FIG. 2, the electronic device 1 may alternately be in the display mode and in the fingerprint sensing mode. The first light source 180 or the second light source 190 may be alternately switched on and off by referring to the above-mentioned principles to corresponding to the optional display mode or the optional fingerprint sensing mode of the electronic device 1.

Figure 3:
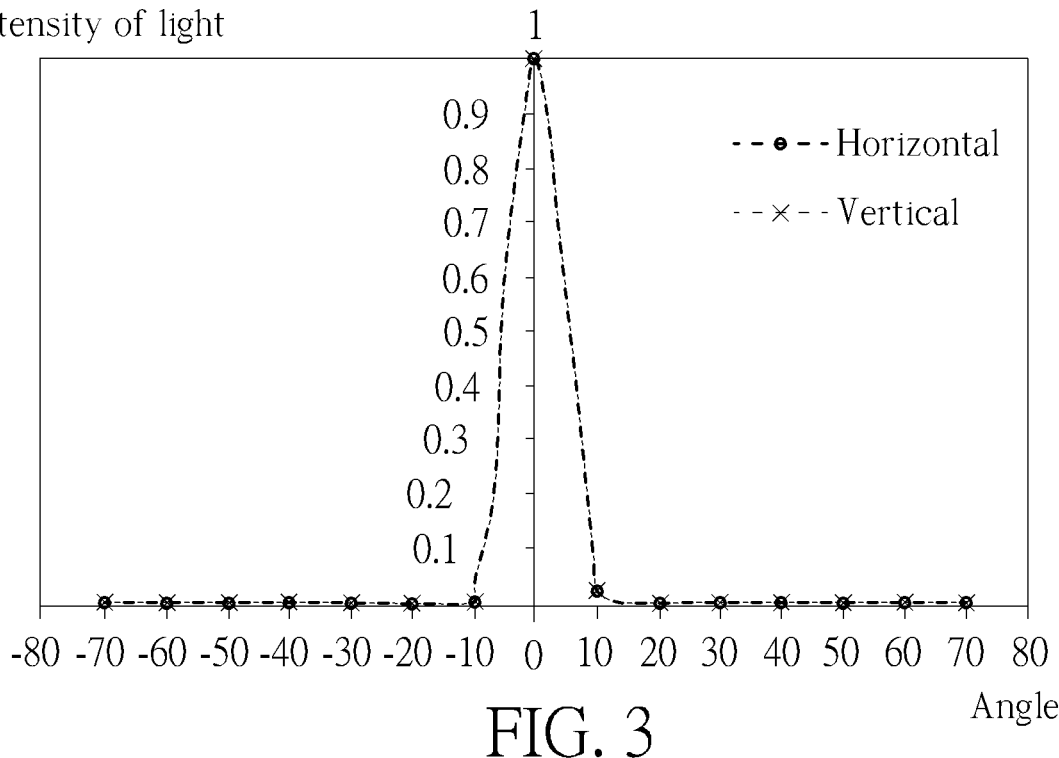
FIG. 3 is a schematic diagram showing the relationship between the relative intensity of light and the angle in the electronic device of each embodiment of the present disclosure, to define the half-value angle used in the present disclosure.

FIG. 3 is a diagram showing the relationship between light intensity and angle in the electronic device of each embodiment of the present disclosure, to define the concepts of collimated light and non-collimated light applied in the present disclosure. In FIG. 3, the vertical axis represents the relative intensity of light, and the light with the largest relative intensity is defined as the strongest light. The horizontal axis represents the angle between the traveling direction of the light and the traveling direction of the strongest light. It may be observed from FIG. 3 that the greater the angle between the traveling direction of the light and the traveling direction of the strongest light is, the smaller the light intensity is. If the relative light intensity of the strongest light is defined as 1, then the light with a relative light intensity of 0.5 to have an angle with the traveling direction of the strongest light is defined as the half-value angle, for example, the half-value angle in FIG. 3 is about ±8 degrees. Light with a half-value angle within ±15 degrees is defined as collimated light, and light with a half-value angle greater than ±15 degrees is defined as non-collimated light. In addition, it may be observed from FIG. 3 that the light intensity substantially drops to close to zero if the half-value angle is greater than ±15 degrees.

In the electronic device 1 of the first embodiment of the present disclosure, the light 181 emitted by the first light source 180 which is adjacent to the cover layer 110 may be provided for the fingerprint recognition. The distance between the light 181 and the fingerprint is shorter, and the reflected light path is also shorter, which may improve the photoelectric conversion efficiency and the sensing accuracy, and to reduce the incidence of other stray light. Therefore, the problem of stray light interference may be improved. Based on one or more of the above advantages, the electronic device and/or the fingerprint recognition method provided in this embodiment may provide better fingerprint recognition accuracy.

The electronic device and the method for enabling the electronic device to receive fingerprint data of the present disclosure are not limited to the above-mentioned embodiments. The following continues to disclose other embodiments or variations of the present disclosure. In order to simplify the description and highlight the differences between the embodiments or variations, the same elements are labeled with the same reference numbers in the following, and similar descriptions are not elaborated again. In addition, please refer to the first embodiment for the materials and thickness of each film layer and the conditions of the process steps in the subsequent embodiments of the present disclosure, therefore the details are not elaborated again.

Figure 4A:
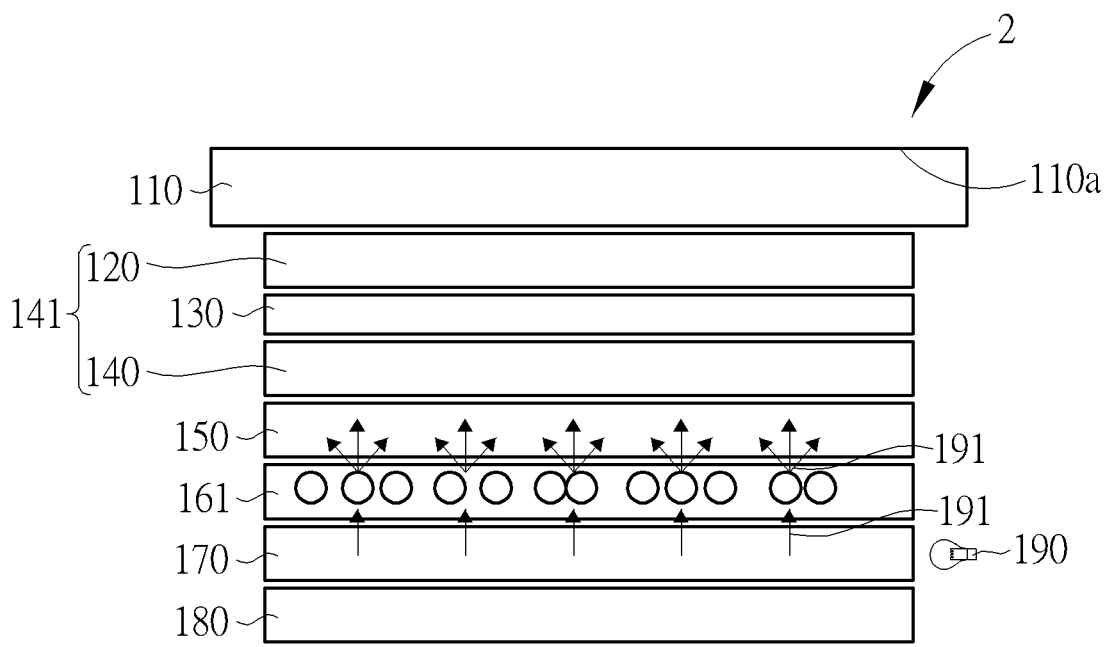
FIG. 4A is a schematic diagram of the electronic device in the display mode according to the second embodiment of the present disclosure.
Figure 4B:
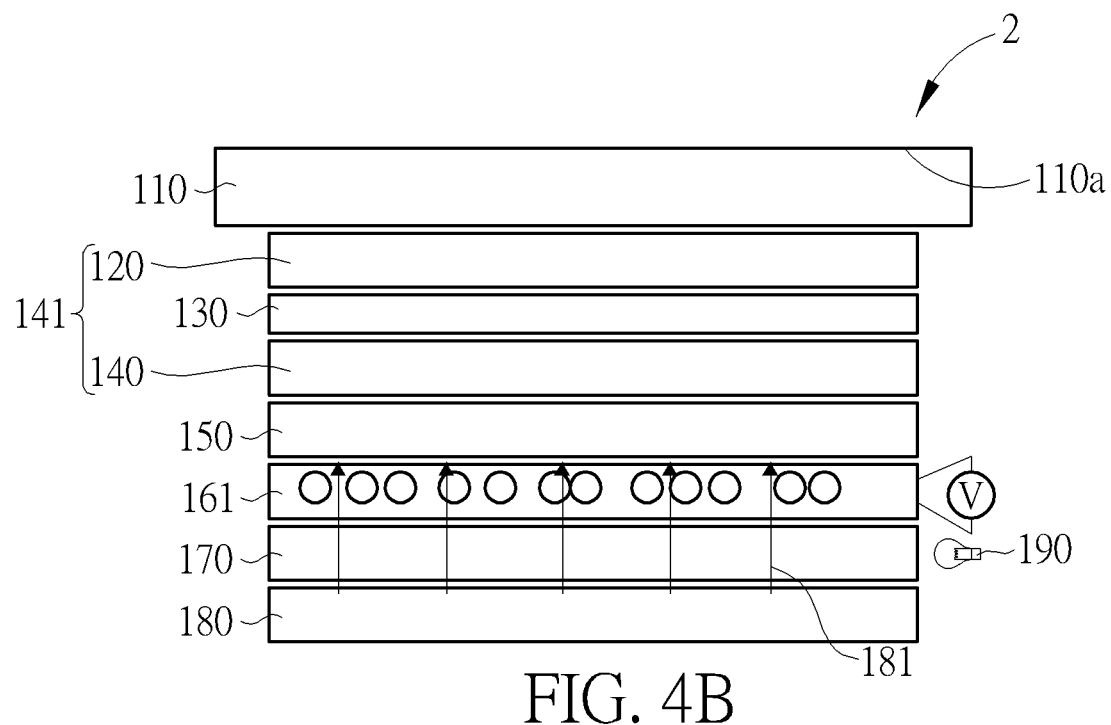
FIG. 4B is a schematic diagram of the electronic device in the fingerprint sensing mode according to the second embodiment of the present disclosure.

FIG. 4A and FIG. 4B are schematic diagrams showing the structures of the electronic device according to the second embodiment of the present disclosure, and each element structure is shown in a cross-sectional view. FIG. 4A shows a schematic diagram of the electronic device in the second embodiment of the present disclosure in the display mode, and FIG. 4B shows a schematic diagram of the electronic device in the second embodiment of the present disclosure in the fingerprint sensing mode. The electronic device 2 of the second embodiment may include a cover layer 110, a color filter layer 120, an optical fingerprint sensor 130, a transistor array 140, an optical structure layer 150, an adjustable light transmittance layer 161, a light guide plate 170, the first light source 180 and the second light source 190.

The electronic device 2 of the second embodiment, like the electronic device 1 of the first embodiment, may be any device that generates light, so the details are not elaborated again. The electronic device 2 of this embodiment further has a built-in sensor that may be used to sense fingerprint data so that the electronic device 2 has a fingerprint recognition function; for example, may include an optical fingerprint sensor 130 and a first light source 180, but the present disclosure is not limited thereto.

In the electronic device 2 of the second embodiment, the first light source 180 may be a single light source or an integrated light source module. For example, the first light source 180 may be integrated into stack layers of the electronic device 2 to become an integrated light source. An integrated light source module may include a light emitting diode plus lens, and the lens may include a combination of a concave lens element, a telecentric lens element, etc., but the present disclosure is not limited thereto. The second light source 190 may include, for example, a side-in type backlight source. The adjustable light transmittance layer 161 may be disposed between the optical structure layer 150 and the first light source 180, and may be an optical material layer that may adjust the light transmittance ratio by applying an external voltage, that is, the light scattering haze state and the light penetrating transparent state, for example, a polymer dispersed liquid crystal (PDLC), but the present disclosure is not limited thereto. In the second embodiment of the present disclosure, the first light source 180 may go with the adjustable light transmittance layer 161 and the optical fingerprint sensor 130 to perform an optical fingerprint sensing function.

The electronic device 2 of the second embodiment may be optionally in a display mode or in a fingerprint sensing mode, and the adjustable light transmittance layer 161, the first light source 180, and the second light source 190 may be subjected to switch on and to switch off accordingly. Only the differences between the electronic device 2 of the second embodiment and the electronic device 1 of the first embodiment are described in the following, and the similar details are not elaborated again.

Figure 5:
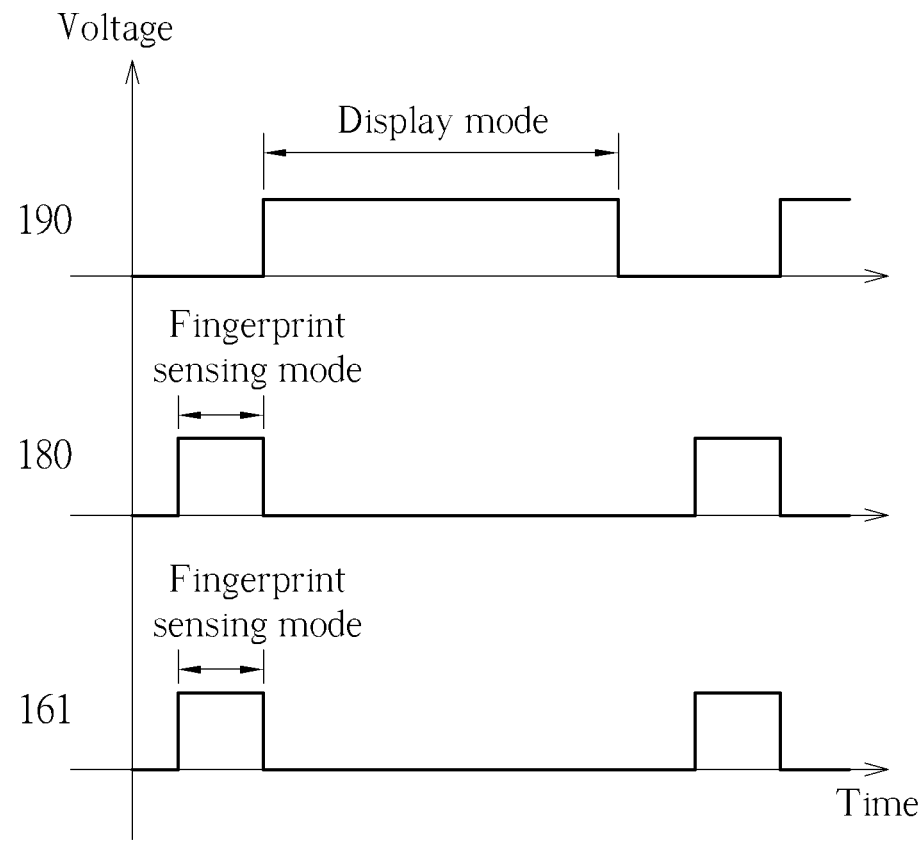
FIG. 5 is a schematic diagram showing the switching control of the first light source and the second light source of the electronic device of the second embodiment of the present disclosure.

FIG. 5 is a schematic diagram showing the switching control of the first light source 180 and the second light source 190 of the electronic device 2 of the second embodiment of the present disclosure. In FIG. 5, the horizontal axis represents time, and the vertical axis represents the voltage at which the first light source 180, the adjustable light transmittance layer 161 and the second light source 190 is turned on and off. The unit of time is, for example, in milliseconds (ms), and the unit of voltage is, for example, in Volt (V), but the present disclosure is not limited thereto. Please refer to FIG. 4B and FIG. 5, the electronic device 2 of the second embodiment may have a fingerprint sensing mode and a display mode, respectively. In terms of time, the first light source 180 is turned on and at the same time a sufficient external voltage is applied to the adjustable light transmittance layer 161 when the electronic device 2 is in the fingerprint sensing mode so that the adjustable light transmittance layer 161 is at a transparent state with a transmittance of greater than 90% (transparent state), so the light 181 may substantially pass through the adjustable light transmittance layer 161 and reach the fingerprint pattern on the cover layer 110 at an incident angle close to the normal direction of the cover layer 110. Therefore, the light 181 and the optical fingerprint sensor 130 may help the user to perform the identity recognition. At this time, the second light source 190 of the electronic device 2 may be turned off, that is, the electronic device 2 is not in the display mode.

Next, please refer to FIG. 4A and FIG. 5, the second light source 190 may be turned on to generate light 191 to display a predetermined image or picture without applying an external voltage to the adjustable light transmittance layer 161 when the electronic device 2 is in the display mode so that the adjustable light transmittance layer 161 is in a diffusing state with a transmittance of less than 90%, for example. When the adjustable light transmittance layer 161 is in a diffusion state, the electronic device 2 may be in the display mode regardless of whether the first light source 180 of the electronic device 2 is turned off or on. Turning on the first light source 180 may help increase the brightness of the display mode. As shown in FIG. 5, optionally the electronic device 2 may alternately be in the display mode and in the fingerprint sensing mode. The first light source 180 or the second light source 190 may be switched on and off in response to the display mode or the fingerprint sensing mode of the electronic device 2 according to the above-mentioned principles.

In an example of the electronic device 2 of the second embodiment, there may be an optical fingerprint sensor 130. In another example, the optical fingerprint sensor 130 may be absent. Optionally, the electronic device 2 of the second embodiment may respectively have a narrow viewing angle state or a wide viewing angle state regardless whether it is in the fingerprint sensing mode or not. For example, the light 181 may substantially be collimated light after passing through the adjustable light transmittance layer 161 when the adjustable light transmittance layer 161 is in a transparent state (as shown in FIG. 4B) and serve as the illuminating light of the light control panel 141 for use in a narrow viewing angle display application, so that the electronic device 2 may achieve a privacy effect, for example, with a narrow viewing angle, but the present disclosure is not limited thereto. On the other hand, the angle at which the light 181 and/or the light 191 enters the light control panel 141 may be adjusted when the adjustable light transmittance layer 161 is in a diffusing state (as shown in FIG. 4A), so that the light control panel 141 of the electronic device 2 may be for use in a wide viewing angle display application.

In yet another example (not shown) of the electronic device 2 of the second embodiment of the present disclosure, the stack layer structure may be further simplified, for example, the structure may include a cover layer, a color filter layer, an optical fingerprint sensor, a transistor array, an optical structure layer, an adjustable light transmittance layer, the light guide plate and a second light source, but the present disclosure is not limited thereto. The adjustable light transmittance layer may be disposed between the transistor array and the optical structure layer, and is closer to the cover layer than the optical structure layer is. The optical structure layer may be, for example, a reversing prism, but the present disclosure is not limited thereto, and is provided corresponding to the light guide plate. The light guide plate may have a microstructure with dots, so that the second light source may be adjusted to become collimated light to achieve the display or fingerprint sensing function by the optical structure layer, but the present disclosure is not limited thereto. The second light source may include a side-in backlight source to perform the optical fingerprint sensing function together with the adjustable light transmittance layer. Therefore, the electronic device of this example may also be in a display mode or in a fingerprint sensing mode to switch the adjustable light transmittance layer and the second light source on and off accordingly. For example, the second light source may be turned on and at the same time a sufficient external voltage is applied to the adjustable light transmittance layer to subject the adjustable light transmittance layer to a transparent state when the electronic device is in the fingerprint sensing mode, so the light emitted by the second light source becomes collimated light after passing through the special dot structure of the light guide plate and reaches the fingerprint pattern on the cover layer at an incident angle close to the normal direction of the cover layer. Therefore, the collimated light and optical fingerprint sensor may perform the recognition of the user's identity.

No external voltage may be applied to the adjustable light transmittance layer when the electronic device is in the display mode, so that the adjustable light transmittance layer is in a diffusion state. The light from the first light source is still able to pass through the color filter layer in the diffusing state to generate light to display a predetermined image or picture. The electronic device optionally may be alternately in a display mode and in a fingerprint sensing mode. The adjustable light transmittance layer may be switched between the diffusing state and the transparent state corresponding to the optional display mode or to the optional fingerprint sensing mode of the electronic device according to the above principles. In this embodiment, it is possible that only the second light source is present so it may be a technically feasible solution with a relatively simple structure combination.

Regardless of whether the electronic device 2 of the second embodiment is in the fingerprint sensing mode or not, the electronic device 2 of the second embodiment may also have a narrow viewing angle state or a wide viewing angle mode by adjusting the state of the adjustable light transmittance layer 161. The light reaches the fingerprint pattern on the cover layer at an incident angle parallel with a direction close to the normal direction of the cover layer after the light substantially passes through the adjustable light transmittance layer, to reduce the probability of the incidence of other stray light, thus improving the problem of stray light interference. Due to one or more of the above advantages, the electronic device and/or fingerprint recognition method provided in this embodiment may provide better fingerprint recognition accuracy.

Figure 6A:
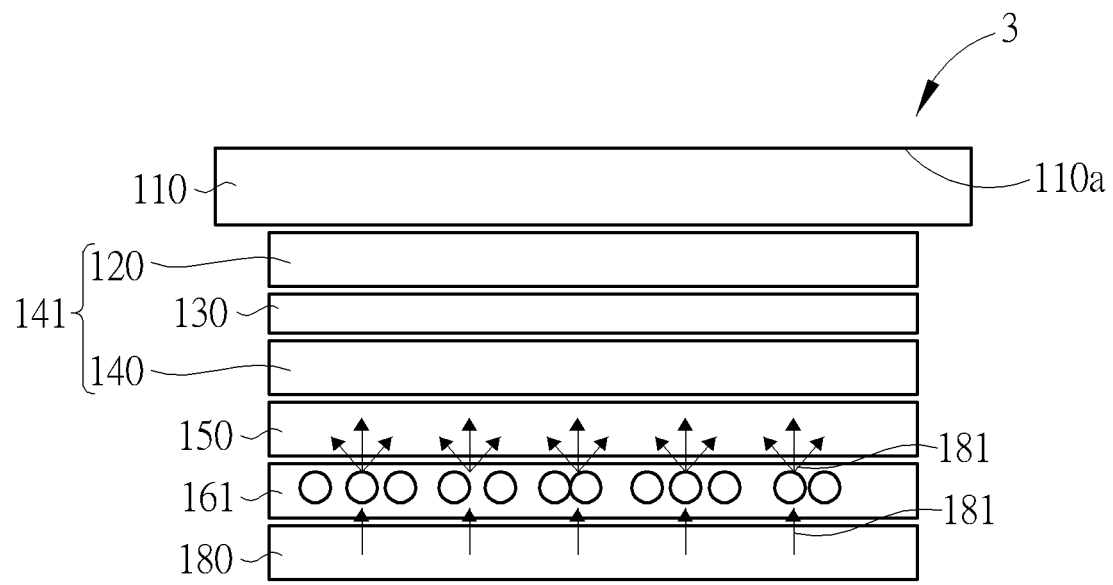
FIG. 6A is a schematic diagram of the electronic device in the display mode according to the third embodiment of the present disclosure.
Figure 6B:
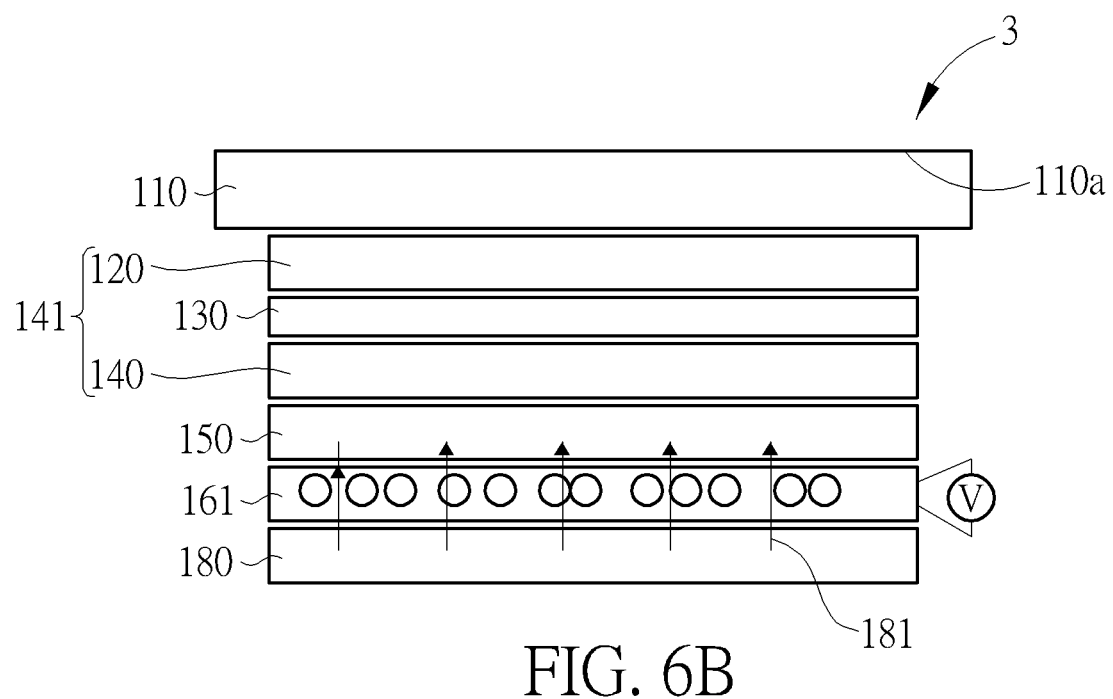
FIG. 6B is a schematic diagram of the electronic device in the fingerprint sensing mode according to the third embodiment of the present disclosure.

FIG. 6A and FIG. 6B are schematic diagrams showing the structures of the electronic device of the third embodiment of the present disclosure, and each component structure is shown in a cross-sectional view. FIG. 6A shows a schematic diagram of the electronic device of the third embodiment of the present disclosure in a display mode, and FIG. 6B shows the electronic device of the third embodiment of the present disclosure in a fingerprint sensing mode. The electronic device 3 of the third embodiment may include a cover layer 110, a color filter layer 120, an optical fingerprint sensor 130, a transistor array 140, an optical structure layer 150, an adjustable light transmittance layer 161, and a first light source 180. The first light source 180 may represent an integrated collimated light source module to go with the adjustable light transmittance layer 161 to perform an optical fingerprint sensing function.

The electronic device 3 of the third embodiment, like the electronic device 1 shown in the first embodiment, may be any device that generates light, so the details are not elaborated again. The electronic device 3 of this embodiment has a built-in sensor that may be used to sense fingerprint data so that the electronic device 3 may have a fingerprint recognition function, for example, it may include an optical fingerprint sensor 130, an adjustable light transmittance layer 161, and a first light source 180, but the present disclosure is not limited thereto.

The electronic device 3 of the third embodiment optionally may be in a display mode or in a fingerprint sensing mode, and the adjustable light transmittance layer 161 and the first light source 180 may be subjected to switch on and to switch off accordingly. Only the differences between the electronic device 3 of the third embodiment and the electronic device 2 of the second embodiment are described in the following, and the similar details are not elaborated again.

Figure 7:
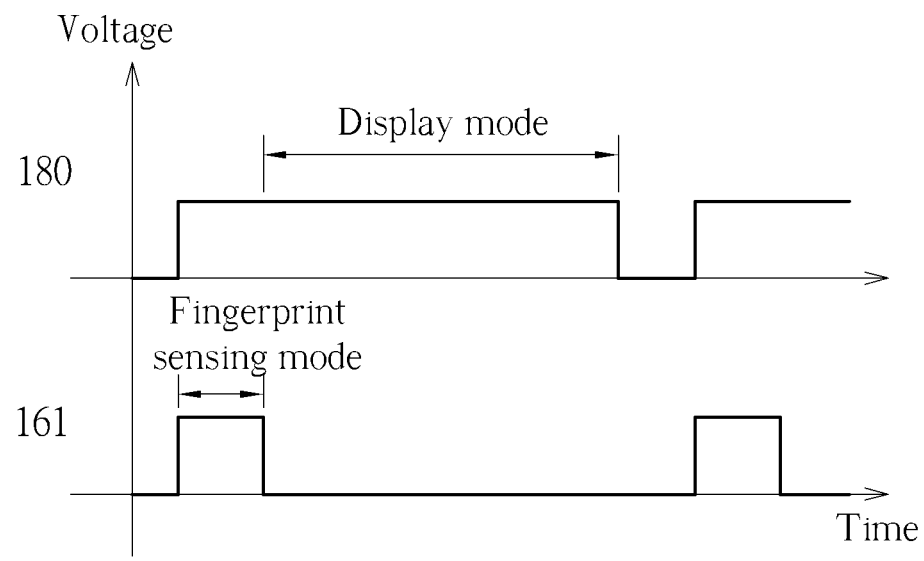
FIG. 7 is a schematic diagram showing the switching control of the first light source and the polymer dispersed liquid crystal layer of the electronic device of the third embodiment of the present disclosure.

FIG. 7 is a schematic diagram showing the switching control of the first light source 180 and the adjustable light transmittance layer 161 of the electronic device 3 of the third embodiment of the present disclosure. In FIG. 7, the horizontal axis represents time, and the vertical axis represents the voltage at which the first light source 180 and the adjustable light transmittance layer 161 are turned on and off. The unit of time is, for example, in milliseconds (ms), and the unit of voltage is, for example, in Volt (V), but the present disclosure is not limited thereto. Please refer to FIG. 6B and FIG. 7, the electronic device 3 of the third embodiment may have a fingerprint sensing mode and a display mode, respectively. In terms of time, the first light source 180 may be turned on and at the same time, a sufficient external voltage is applied to the adjustable light transmittance layer 161 when the electronic device 3 is in the fingerprint sensing mode so that the adjustable light transmittance layer 161 is subjected to a transparent state with a transmittance greater than 90%, so the light 181 provided by the first light source 180 may substantially pass through the adjustable light transmittance layer 161 and reach the fingerprint pattern on the cover layer 110 at an incident angle parallel with a direction close to the normal direction of the cover layer 110, and reflect appropriate light signals into the optical fingerprint sensor 130. Thus, the light 181 or the optical fingerprint sensor 130 may help the recognition of the user's identity.

Next, please refer to FIG. 6A and FIG. 7, no external voltage may be applied to the adjustable light transmittance layer 161 when the electronic device 3 is in the display mode so that the adjustable light transmittance layer 161 may be at a diffusing state with a transmittance less than 90%, for example. The light 181 from the first light source 180 may then pass through the adjustable light transmittance layer 161 to adjust the incident angle of the light 181, and then enter the color filter layer 120 to generate light to display a predetermined image or picture. The electronic device 3 optionally may also be alternately in the display mode and in the fingerprint sensing mode. The adjustable light transmittance layer 161 may be switched between the diffusing state and the transparent state in response to the optional display mode or the optional fingerprint sensing mode of the electronic device 3 according to the above-mentioned principles.

In this embodiment, the light guide plate and the additional second light source may be omitted, so it may be a technically feasible solution with a simpler structure combination. The light reaches the fingerprint pattern on the cover layer at an incident angle parallel with a direction close to the normal direction of the cover layer after the light substantially passes through the adjustable light transmittance layer, to reduce the probability of the incidence of other stray light, thus improving the problem of stray light interference. Due to one or more of the above advantages, the electronic device 3 and/or fingerprint recognition method provided in this embodiment may provide better fingerprint recognition accuracy.

Figure 8:
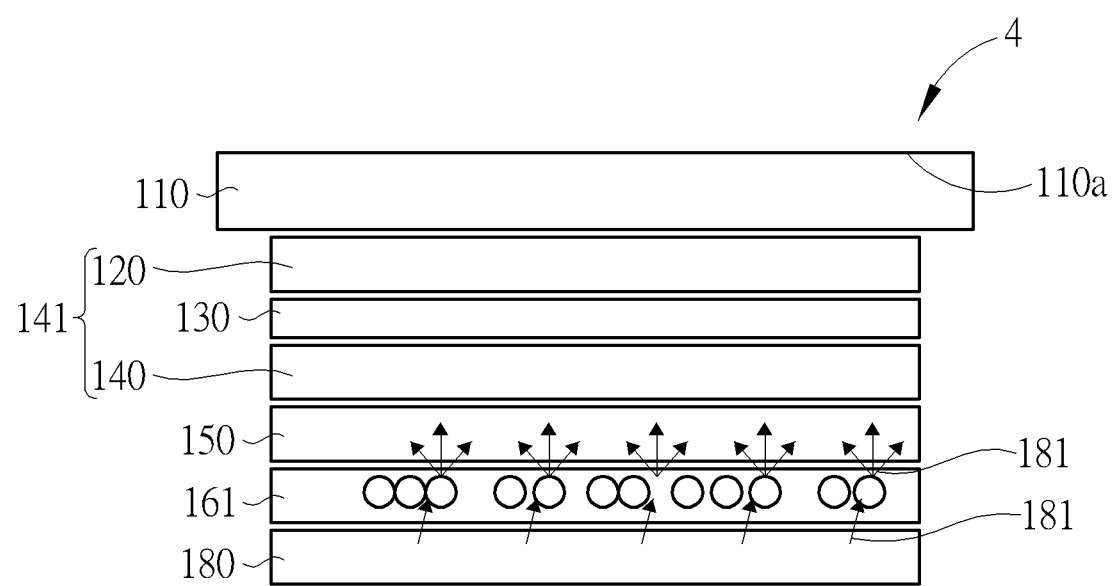
FIG. 8 is a schematic diagram of the electronic device according to the fourth embodiment of the present disclosure.

FIG. 8 is a schematic diagram showing the structure of the electronic device of the fourth embodiment of the present disclosure, and each component structure is shown in a cross-sectional view. The electronic device 4 of the fourth embodiment may include a cover layer 110, a color filter layer 120, an optical fingerprint sensor 130, a transistor array 140, an optical structure layer 150, an adjustable light transmittance layer 161, and a first light source 180. The adjustable light transmittance layer 161 may be disposed between the light control panel 141 and the first light source 180.

In the electronic device 4 of the fourth embodiment, the first light source 180 may be an integrated collimated light source module. In particular, the direction of the light 181 generated by the first light source 180 may have an oblique angle which is not 0 degree with respect to the normal direction of the cover layer 110 when the light 181 first enters the cover layer 110. The adjustable light transmittance layer 161 may include a polymer dispersed liquid crystal. In the fourth embodiment of the present disclosure, the first light source 180 may go with the adjustable light transmittance layer 161 to perform an optical fingerprint sensing function.

The electronic device 4 of the fourth embodiment, like the electronic device 1 of the first embodiment, may be any device that generates light so the details are not elaborated again. The electronic device 4 of this embodiment has a built-in sensor that may be used to sense fingerprint data so that the electronic device 4 may have a fingerprint recognition function; for example, may include an optical fingerprint sensor 130, an adjustable light transmittance layer 161, and a first light source 180, but the present disclosure is not limited thereto. The electronic device 4 of this embodiment optionally may be in a display mode or in a fingerprint sensing mode, and the adjustable light transmittance layer 161 and the first light source 180 may be subjected to switch on and to switch off accordingly. The operation method of the display mode or of the fingerprint sensing mode of the electronic device 4 of the fourth embodiment is basically the same as that of the electronic device 3 of the third embodiment, so the details are not elaborated again. In particular, the direction of the light 181 provided by the first light source 180 may have an oblique angle which is not 0 degree with respect to the normal direction of the cover layer 110 when the light 181 first enters the cover layer 110 for optical fingerprint recognition. Therefore, the light 181 and the optical fingerprint sensor 130 may help the recognition of the user's identity.

In another example of the electronic device 4 of the fourth embodiment of the present disclosure (not shown), the adjustable light transmittance layer 161 may be disposed between the first light source 180 and the optical structure layer 150. In addition, the direction of the light 181 provided by the first light source 180 may approximately parallel to the normal direction of the cover layer 110 when the light 181 first enters the cover layer 110.

In yet another example of the electronic device 4 of the fourth embodiment of the present disclosure, two optical structure layers 150 may be included, so the adjustable light transmittance layer 161 may be disposed between the two optical structure layers 150. In addition, the direction of the light 181 provided by the first light source 180 may approximately parallel to the normal direction of the cover layer 110 when the light 181 first enters the cover layer 110.

In yet another example of the electronic device 4 of the fourth embodiment of the present disclosure, the optical structure layer 150 may be absent from the electronic device 4, so the adjustable light transmittance layer 161 may be disposed between the transistor array 140 and the first light source 180. In addition, the direction of the light 181 provided by the first light source 180 may approximately parallel to the normal direction of the cover layer 110 when the light 181 first enters the cover layer 110.

In this embodiment, the light guide plate and the additional second light source may be omitted, or even the optical structure layer may be omitted, so it may be a technically feasible solution with a simpler structural combination. At the same time, the light 181 reaching the fingerprint pattern on the cover layer is not limited to have an incident angle close to 0 degree to make the design more flexible.

Figure 9:
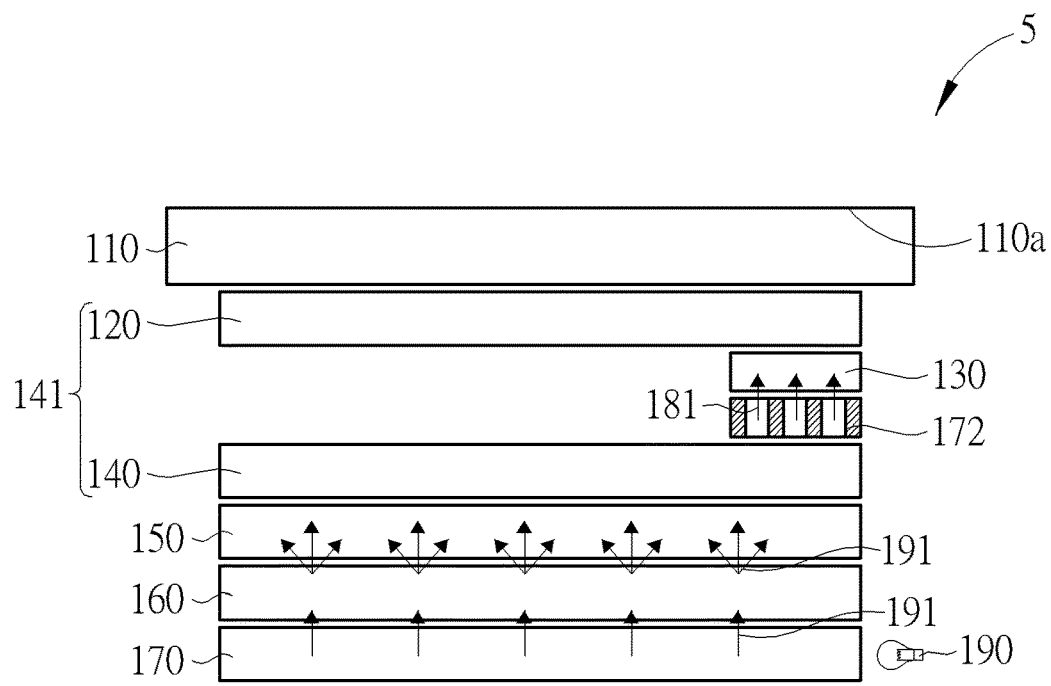
FIG. 9 is a schematic diagram of the electronic device according to the fifth embodiment of the present disclosure.

FIG. 9 is a schematic diagram showing the structure of the electronic device of the fifth embodiment of the present disclosure, and each component structure is shown in a cross-sectional view. The electronic device 5 of the fifth embodiment of the present disclosure may include a cover layer 110, a light control panel 141, an optical fingerprint sensor 130, an optical structure layer 150, a diffusing layer 160, a light guide plate 170, an optical adjustable structure 172 and a second light source 190. The light control panel 141 may include a color filter layer 120 and a transistor array 140. In the electronic device 5 of the fifth embodiment, a side-in backlight source may be used as the second light source 190. The light control panel 141 may include a liquid crystal or an electronic paper. The optical adjustable structure 172 may be formed by a lithographic process, or may include a commercially available privacy film.

The electronic device 5 of the fifth embodiment, like the electronic device 1 shown in the first embodiment, may be any device that generates light, so the details are not elaborated again. The electronic device 5 of this embodiment has a built-in sensor that may be used to sense fingerprint data so that the electronic device 5 may have a fingerprint recognition function; for example, may include an optical fingerprint sensor 130, an optical adjustable structure 172 and a second light source 190, but the present disclosure is not limited thereto.

Please refer to FIG. 9. The light control panel 141 may be disposed between the cover layer 110 and the light guide plate 170.

The optical adjustable structure 172 may be disposed in the light control panel 141, for example, between the second element 190 used as a backlight source and the cover layer 110. The optical fingerprint sensor 130 may be disposed between the second element 190 used as a backlight source and the cover layer 110, for example, between the light guide plate 170 and the cover layer 110. The second light source 190 may provide light 191, and after the light 191 passes through the optical adjustable structure 172, it is adjusted to be the light 181. In the electronic device 5 of this embodiment, the optical adjustable structure 172 may be a privacy film, but the present disclosure is not limited thereto. The privacy film is designed like a grating. The light of a large angle is blocked after passing through the privacy film, leaving only the light source of a small angle to pass through. In the electronic device 5 of this embodiment, the optical adjustable structure 172 and the optical fingerprint sensor 130 are correspondingly arranged. After the light 191 provided by the second light source 190 passes through the optical adjustable structure 172, it may be regarded as adjusted light to become light like collimated light 181 to enter the cover layer 110 to sense the fingerprint pattern on the cover layer 110 (not shown). The light 181 and the optical fingerprint sensor 130 may help the recognition of the user's identity.

In the electronic device 5 of the fifth embodiment of the present disclosure, the relative positions of the optical fingerprint sensor 130 and the optical adjustable structure 172 in the electronic device 5 are not limited. For example, as shown in FIG. 9, the optical fingerprint sensor 130 may be disposed above the optical adjustable structure 172 and adjacent to the cover layer 110. In another example, the optical adjustable structure 172 may be disposed above the optical fingerprint sensor 130 and adjacent to the cover layer 110, while the optical adjustable structure 172 may even directly contact the cover layer 110, and the optical fingerprint sensor 130 is disposed below the color filter 120. Or, both the optical fingerprint sensor 130 and the optical adjustable structure 172 may be disposed between the color filter layer 120 and the cover layer 110.

In another example of the electronic device 5 of the fifth embodiment of the present disclosure (not shown), the first light source 180 may also be used as the light source of the electronic device 5 to simultaneously replace the side-in type backlight source and the light guide plate, but the present disclosure is not limited thereto. The first light source 180 may be a single light source or an integrated light source module. In this example, the relative positions of the optical fingerprint sensor 130 and the optical adjustable structure 172 in the electronic device 5 are not limited.

The electronic device 5 of the fifth embodiment of the present disclosure optionally may be in a display mode or in a fingerprint sensing mode. When the electronic device 5 is in the display mode, the light 191 provided by the second light source 190 may pass through the color filter layer 120 to generate light to display a predetermined image or picture. The electronic device 5 optionally may also be alternately in the display mode and in the fingerprint sensing mode. Please refer to the aforementioned description of FIG. 7 for the details.

In the electronic device 5 of the fifth embodiment of the present disclosure, an optical adjustable structure may be provided to convert non-collimated light into collimated light. Since in the electronic device 5 of the fifth embodiment of the present disclosure the optical adjustable structure can convert part of the non-collimated light into collimated light, there is no need to arrange an additional collimated light source, and the photoelectric conversion efficiency or sensing accuracy may also be improved to reduce the incidence of other stray light, so it may improve the problem of stray light interference.

Figure 10:
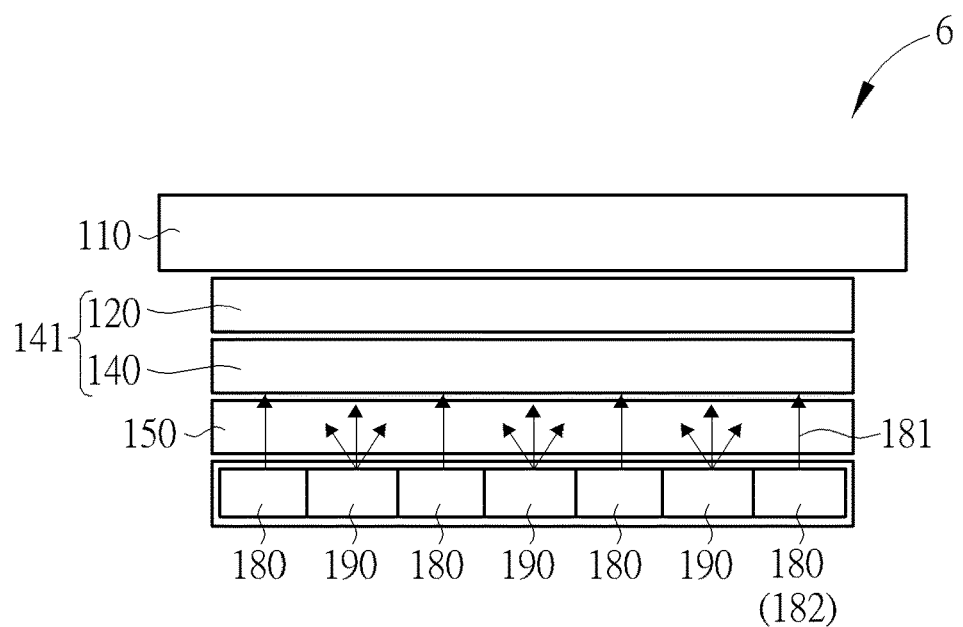
FIG. 10 is a schematic diagram of the electronic device according to the sixth embodiment of the present disclosure.

FIG. 10 is a schematic diagram showing the structure of the electronic device of the sixth embodiment of the present disclosure, and each component structure is shown in a cross-sectional view. The electronic device 6 of the sixth embodiment may include a cover layer 110, a light control panel 141, an optical structure layer 150, a first light source 180, and a second light source 190. The light control panel 141 may include a color filter layer 120 and a transistor array 140. The second light source 190 may be disposed adjacent to the first light source 180. The optical structure layer 150 may be disposed between the first light source 180 and the light control panel 141. The light control panel 141, the first light source 180 and the second light source 190 may be disposed on the same side of the cover layer 110 in a manner as defined before. The optical fingerprint sensor is optional in the electronic device 6 of the sixth embodiment, but the present disclosure is not limited thereto.

In the electronic device 6 of the sixth embodiment, the first light source 180 may be a single light source or an integrated light source module, the second light source 190 may be non-collimated light, and the second light source 190 may provide, for example, a light source of a half-value angle is greater than ±15 degrees. The direction of the light 181 generated by the first light source 180 may have an oblique angle which is not 0 degree with respect to the normal direction of the cover layer 110 when the light 181 first enters the cover layer 110.

The electronic device 6 of the sixth embodiment may optionally be in different states. Regardless of whether it is in the fingerprint sensing mode, the electronic device 6 of the sixth embodiment may have a narrow viewing angle state or a wide viewing angle state. For example, when the first light source 180 of the collimated light source is turned on but the second light source 190 is turned off, the light control panel 141 may be switched to the narrow viewing angle state or a narrow viewing angle display application, so that the electronic device 6 may achieves a privacy effect of narrow viewing angle, but the present disclosure is not limited thereto. On the other hand, when the second light source 190 is turned on to provide non-collimated light, the light control panel 141 of the electronic device 6 of the sixth embodiment may be switched to the wide viewing angle state or a wide viewing angle display application.

As shown in FIG. 10, the electronic device 6 of the sixth embodiment may not have an adjustable light transmittance layer. When there is no adjustable light transmittance layer, the first light source 180 or the second light source 190 may be regionally arranged, or the first light source 180 or the second light source 190 may also be regionally driven. For example, the first light source 180 is disposed in one region and the second light source 190 is disposed in another region. The first light source 180 and the second light source 190 may be arranged to form a pattern. In the example where the optical fingerprint sensor is present, the first light source 180 may also be arranged corresponding to the optical fingerprint sensor, that is, the locations of the first light source 180 and the second light source 190 may be adjusted according to the location of the optical fingerprint sensor. The first light source 180 and the second light source 190 may not be necessarily alternately arranged. For example, the first light source 180 and the second light source 190 may also be significantly regionally arranged. For example, the first light source 180 may be collectively arranged in a region, and the second light source 190 may be collectively arranged in another region, but the present disclosure is not limited thereto.

In this embodiment, the electronic device 6 may have a state of a narrow viewing angle or a state of a wide viewing angle, respectively. The first light source 180 or the second light source 190 may be regionally arranged, or the first light source 180 or the second light source 190 may be regionally driven. Still the optical fingerprint sensor is optional in the electronic device 6 of the sixth embodiment to make the design more flexible. Due to one or more of the above advantages, the electronic device 6 and/or fingerprint recognition method provided in this embodiment may be a simpler technical feasible solution.

Figure 11:
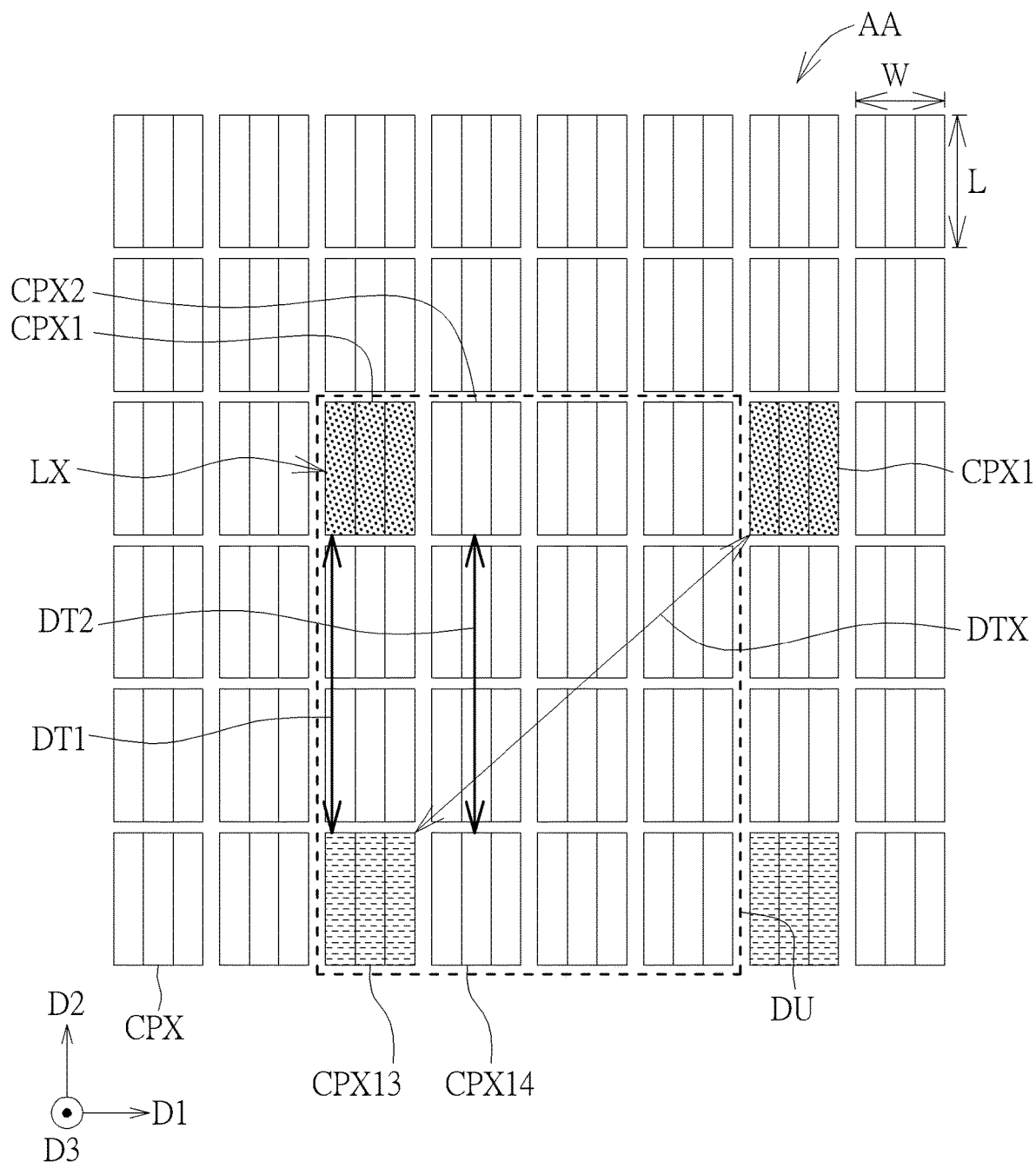
FIG. 11 is a schematic diagram of the fingerprint sensing mode of the electronic device of each embodiment of the present disclosure.

FIG. 11 is a schematic diagram of the fingerprint sensing mode of the electronic device of each embodiment of the present disclosure. In FIG. 11, in the first sequence of fingerprint sensing, for example, the light in the composite graphic element CPX1 of at least one unit detection block DU is turned on to provide the graphic element LX (that is, the first group of light-providing graphic elements LX shown in dotted mesh) to generate a part of the scanning light which is reflected by the finger to the unit detection block DU, and is, for example, received by the fingerprint sensor FPS of the composite picture element CPX13 (a first part of the fingerprint sensor unit), so the data in the fingerprint sensor FPS of the composite image element CPX13 is subsequently collected; in the second sequence (not shown), for example, the light in the composite image element CPX2 of at least one unit of detection block DU is turned on to provide the graphic element LX (that is, the second group of the graphic element LX provided by light) to generate apart of the scanning light which is reflected by the finger to the unit detection block DU, and for example is received by the fingerprint sensor FPS of the composite picture element CPX14 (a second part of the fingerprint sensor unit), so the data in the fingerprint sensor FPS of the composite image element CPX14 is subsequently collected, but the present disclosure is not limited thereto. The above-mentioned turned-on light-providing graphic element LX and the collected fingerprint sensor FPS (that is, the sensing data which is collected or read) may be disposed in two different composite graphic elements, and the relative position of the two composite graphic elements is not limited to those shown in FIG. 11. The relative position of the graphic element LX and the received fingerprint sensor FPS may be optionally adjusted.

The electronic device of each embodiment of the present disclosure may reduce the generation of stray light by using a collimated light source or an adjusted collimated light source structure to obtain the intensity difference of reflected light caused by the fingerprint ridge or valley due to the difference in the light path to achieve the function of fingerprint recognition design embedded in the display. As long as the features of the embodiments do not violate or conflict the spirit of the invention, they may be arbitrarily combined.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
   a cover layer;
   a light control panel;
   an optical fingerprint sensor;
   a first light source; and
   an adjustable light transmittance layer disposed between the light control panel and the first light source and the adjustable light transmittance layer is in a diffusing state when the electronic device is in a display mode;
   wherein the light control panel, the optical fingerprint sensor and the first light source are disposed at a same side of the cover layer and the first light source is for fingerprint sensing and capable of providing a light of which half-value angle is between −15° and 15°.

2. The electronic device of claim 1, wherein at least a portion of the light enters the cover layer before entering the light control panel for a first time when reflected by a detected object.

3. The electronic device according to claim 1, wherein a direction of the light has an oblique angle with respect to a normal direction of the cover layer.

4. The electronic device of claim 1, wherein the first light source is turned off when the electronic device is not in a fingerprint sensing mode.

5. The electronic device of claim 4, further comprising:
   a second light source, wherein the second light source is turned on when the electronic device is in a display mode and the second light source is turned off when the electronic device is in the fingerprint sensing mode.

6. The electronic device according to claim 1, further comprising an optical structure layer, wherein the light control panel is disposed on the optical structure layer.

7. The electronic device according to claim 6, further comprising a light guide plate, wherein the optical structure layer is disposed on the light guide plate.

8. The electronic device according to claim 7, further comprising a diffusing layer disposed between the optical structure layer and the light guide plate.

9. The electronic device of claim 1, wherein the adjustable light transmittance layer is in a transparent state when the electronic device is in a fingerprint sensing mode.

10. The electronic device of claim 1, wherein a direction of the light which provided by the first light source is parallel to a normal direction of the cover layer.

11. An electronic device, comprising:
    a cover layer;
    a backlight;
    a light control panel disposed between the cover layer and the backlight;
    an optical adjustable structure between the cover layer and the backlight;
    an adjustable light transmittance layer disposed between the light control panel and the backlight and the adjustable light transmittance layer is in a diffusing state when the electronic device is in a display mode; and
    an optical fingerprint sensor disposed between the cover layer and the backlight, and corresponding to the optical adjustable structure;
    wherein the backlight provides a light for fingerprint sensing and the light is passing through the optical adjustable structure to become a collimated light and a half-value angle of the collimated light is between −15° and 15°.

12. The electronic device according to claim 11, wherein the optical adjustable structure is disposed in the light control panel.

13. An electronic device, comprising:
    a cover layer;
    a light control panel;
    a first light source; and
    a second light source disposed adjacent to the first light source and providing a second light of which half-value angle is greater than −15° and 15°;
    wherein the first light source is turned on and the second light source is turned off when the electronic device is in a narrow viewing angle state;
    wherein the light control panel and the first light source are disposed at a same side of the cover layer and the first light source provides a first light of which half-value angle is between −15° and 15°.

14. The electronic device of claim 13, wherein the first light source is turned off and the second light source is turned on when the electronic device is in a wide viewing angle state.

15. The electronic device according to claim 13, wherein a direction of the first light which provided by the first light source is parallel to a normal direction of the cover layer.

* * * * *